Patented Aug. 23, 1938

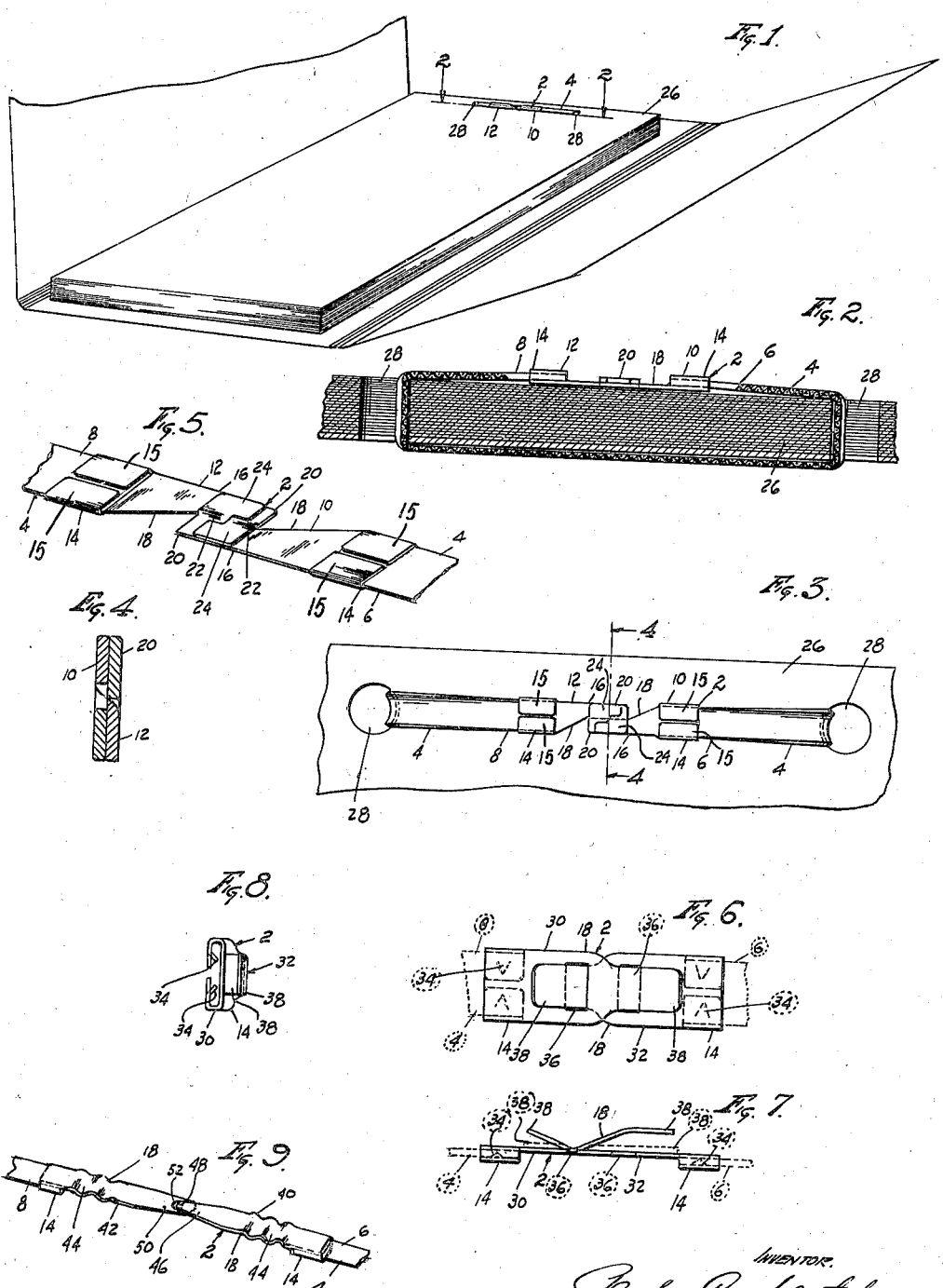

2,127,498

UNITED STATES PATENT OFFICE 2,127,498

FLEXIBLE FASTENER AND THE LIKE

Paul A. Westphal, Los Angeles, Calif.

Application January 12, 1935, Serial No. 1,549

2 Claims. (Cl. 24—67)

My invention relates to fasteners, and more particularly to a novel form of paper binder, which is flexible in its use, easily adjustable to any desired thickness or stack of paper, such that can be easily removed from the paper tie-holes, and which, because of its simple construction, may be very inexpensive and economical to manufacture.

Manifestly, an object of my invention, is to provide a flexible or suitably resilient binder member, said binder member being of any preferred length, of which, its ends are provided with suitable interlocking means; said interlocking means may, if so desired, be made in any desired manner and out of any serviceable material, preferably however, out of suitable metal, and adapted to be firmly attached to the said ends of the said binder member; the free ends, locking members, being provided with suitable hooking means, adapted to interlock its ends, one into the other, so that, a firm hold of said locking ends may be had, and when in use, a very minimum of space will be required to fasten and hold the said papers together.

Another object of my invention is to provide said ends of the said resilient binder with suitably formed locking members, which are made out of suitable wear resisting material, having its free ends provided with interlocking means, which when in use, will interlock and hold the said free ends together, thus binding and holding the said paper in place, and, because of its self adjustability to any paper thickness or stack of paper, further because, of its adaptability to be rendered quickly disengaged, said fastener will become indispensable in its scope of usefulness, particularly in the use of filing papers such as office records and the like.

Further objects and advantages of my invention, as will hereinafter more fully appear, I attain by the construction herein shown on the drawing and described in the specification, forming a part of my application.

Reference is had to the accompanying drawing, in which the similar reference characters, denote the similar parts.

In the drawing:

Fig. 1 is the perspective view of the office record file, showing my invention in place and applicable to bind the file papers together.

Fig. 2 is the enlarged cross-sectional view of the file, showing my invention in place and in engaged position, taken on the line 2—2, of the Fig. 1.

Fig. 3 is the fragmentary top view of the file, showing my invention in place, having the clip ends interlocked.

Fig. 4 is the enlarged transverse cross-sectional view of the clip ends, taken on the line 4—4, of the Fig. 3.

Fig. 5 is the perspective view of the clips, shown in engaged position.

Describing my invention more in detail, in its broader aspects, said invention comprises a fastener, generally designated by numeral 2, consisting of a flexible or resilient binding member 4, which may be of any desired length, width or thickness, having its ends 6 and 8 provided with suitable interlocking members 10 and 12 respectively, which, as shown in Figs. 1, 2 and 3, are interchangeable, so that, its manufacture becomes considerably simplified and thus resulting in a simple and a very effective paper fastening device.

The said interlocking members 10 and 12, comprise a folded base member 14, which is considerably wider in its structure than any other part thereof, having a pair of gripping members 15, which are for the purpose to hold in place, when folded, the said end 6 or 8, of the said binding member 4.

The free end 16 of the said interlocking member 10 or 12, is at its mid-section 18, partly tapered toward its base 14, so as to form a suitable hook section 20, which is provided with a suitable sideward bent offset 22, of its horizontal plane, see Fig. 5, thus causing the said hook end section 24 to raise slightly above the said midsection 18, consequently, when in engaged position, the said free ends 16 will interlock with one and the other, without distorting the position of the said base 14, causing said interlocking members 10 and 12 respectively, to lay flat against the stack of the paper 26, holding it downwardly and also preventing a sideward movement of the said binding member 4, which extends and passes through the tie-holes 28, as shown.

While I have thus described my invention with great particularity it will be clear that the same may be modified throughout a wide range. I accordingly do not propose to be limited to the exact details of construction herein shown and described, but reserve the rights in practice to make the necessary changes, which may come within the scope of the appended claims.

I claim as my invention:

1. In the interlocking fastener of the class described consisting of a pair of interlocking members, each member comprising, a base member, a pair of gripping flanges extending sidewardly out of the said base member, a tapered mid-section member extending out of said base member and gradually tapering one of its side edges toward the end into approximately half the width of said base member, and a transverse hook section extending sidewardly from the extended end of said mid-section having its total length commensurating the width of the said base member; said hook section at the junction with said tapered mid-section having an upward and outward bend from the principal plane of said tapered mid-section and said base members, to provide a parallel position of said interlocking members in respect to each other and during their engagement and for preventing sideward disengagement of the said hook sections while in locked position.

2. In the interchangeable fastener, as an article of manufacture, made out of sheet metal, adapted to be used in pairs, each comprising, a base member, a pair of gripping flanges folded at the sides and over the said base member, a tapered mid-section member extending out of said base member gradually tapering one side edge toward the end and into approximately half the width of said base member, a hook section transversely extending out of the end of said tapered mid-section commensurating in its length to the width of said base member; said hook section at its junction with the tapered end of said mid-section having an offset bend extending upwardly and outwardly from the principal plane of said mid-section and said base member, so that the said fastener, when used in pairs, will hold and interlock together in a relatively central position, causing said base members to react parallelly and for preventing their sideward disengagement.

PAUL A. WESTPHAL.